US012741507B2

(12) United States Patent
Beloe

(10) Patent No.: US 12,741,507 B2
(45) Date of Patent: Sep. 22, 2026

(54) CABIN CLIMATE CONTROL ASSEMBLY

(71) Applicant: J. C. Bamford Excavators Limited, Uttoxeter (GB)

(72) Inventor: Neil Beloe, Uttoxeter (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 108 days.

(21) Appl. No.: 18/608,770

(22) Filed: Mar. 18, 2024

(65) Prior Publication Data

US 2024/0308296 A1 Sep. 19, 2024

(30) Foreign Application Priority Data

Mar. 17, 2023 (GB) ...................................... 2303903

(51) Int. Cl.
*B60H 1/00* (2006.01)

(52) U.S. Cl.
CPC ................................ *B60H 1/00899* (2013.01)

(58) Field of Classification Search
CPC .................................................. B60H 1/00899
See application file for complete search history.

(56) References Cited

U.S. PATENT DOCUMENTS 10,562,368 B2 2/2020 Desneux et al.
2010/0012295 A1* 1/2010 Nemesh ............ H01M 10/6568 165/104.19
2019/0375270 A1 12/2019 Boger et al.
2020/0101816 A1 4/2020 Takagi
2020/0223288 A1* 7/2020 Srivastava ......... B60H 1/00764
2020/0238790 A1* 7/2020 Nishiyama ............. B62D 1/065
2020/0290429 A1 9/2020 Blatchley et al.
(Continued)

FOREIGN PATENT DOCUMENTS

DE 4337978 A1 6/1994
DE 102013110965 A1 * 4/2015 ......... B60H 1/00028
DE 102017106251 A1 9/2018
(Continued)

OTHER PUBLICATIONS

FOR1, Air Conditioning System for a Motor Vehicle, 2015, Full Document (Year: 2015).*
(Continued)

*Primary Examiner* — Nael N Babaa
(74) *Attorney, Agent, or Firm* — MARSHALL, GERSTEIN & BORUN LLP

(57) ABSTRACT

A cabin climate control assembly includes a first circuit for circulating a refrigerant; a second circuit for circulating a liquid: an evaporator configured to transfer heat energy to the refrigerant; a compressor configured to compress the refrigerant; a condenser configured to transfer heat energy between the compressed refrigerant and the liquid in the second circuit; and a heat exchanger configured to expel heat energy from the liquid in the second circuit. The cabin climate control assembly includes a heating mode in which it is configured to remove heat energy from air entering or circulating within a cabin via the evaporator, then add the removed heat energy and additional heat energy generated through work done by the compressor back into the air entering or circulating within the cabin via the heat exchanger, in order to raise the temperature of the cabin.

20 Claims, 10 Drawing Sheets

(56) References Cited

U.S. PATENT DOCUMENTS

2022/0111698 A1* 4/2022 Kim .................. B60H 1/00007

FOREIGN PATENT DOCUMENTS

| | | | |
|---|---|---|---|
| DE | 102019101233 | A1 | 7/2019 |
| JP | 2002354608 | A | 12/2002 |
| WO | WO-2022/158153 | A1 | 7/2022 |

OTHER PUBLICATIONS

Search Report, European Patent Application No. 24163990.5, dated Mar. 3, 2025.
Combined Search and Examination Report issued in GB2302903.5, dated Sep. 4, 2023.

* cited by examiner

CABIN CLIMATE CONTROL ASSEMBLY

FIELD

The present invention relates to a cabin climate control assembly, a working vehicle including a cabin climate control assembly, and a method of heating a cabin of a working vehicle.

BACKGROUND

Working vehicles typically have an enclosed cabin with a seat and controls for an operator of the working vehicle. It is known to control the climate within the cabin in order to provide a comfortable working environment for the operator. Typically, working vehicles are driven by an internal combustion engine, which provides a source of heat. In such working vehicles, heat generated by the internal combustion engine is often used to heat the cabin (e.g. via a liquid-to-air heat exchanger which transfers heat from engine coolant to air entering or circulating within the cabin).

For electric working vehicles that do not have an internal combustion engine as a source of heat, it is known to use an electric resistive or "positive temperature coefficient" (PTC) heater to heat the cabin. However, such resistive or PTC heaters can be expensive to install and have high electrical energy consumption, which affects the run time of the working vehicle for its primary purpose (e.g. excavating or materials handling).

In electric automobiles (i.e. on-highway light passenger vehicles), a substantial amount of heat is generated by the electrical components (e.g. motors and batteries) due to the sustained acceleration/deceleration and corresponding battery discharge/regeneration associated with on-road driving. Therefore, it is possible to heat the passenger compartment of an electric automobile by pumping heat from the electrical components to the passenger compartment, which serves a dual purpose of cooling the electrical components. However, electric working vehicles typically have more intermittent acceleration/deceleration and corresponding battery discharge/regeneration due to the types of working operations performed by working vehicles. Therefore, such electrical components (e.g. batteries and motors) may not generate sufficient waste heat to warm the cabin of an electric working vehicle.

The present invention seeks to overcome, or at least mitigate, one or more problems of the prior art.

SUMMARY

A first aspect of the teachings provides a cabin climate control assembly for a working vehicle, the cabin climate control assembly comprising:

- a first circuit for circulating a refrigerant;
- a second circuit for circulating a liquid:
- an evaporator configured to transfer heat energy to the refrigerant in the first circuit;
- a compressor configured to compress the refrigerant in the first circuit and thereby generate additional heat energy in the first circuit; and
- a condenser configured to transfer heat energy between the compressed refrigerant and the liquid in the second circuit; and
- a heat exchanger configured to expel heat energy from the liquid in the second circuit.

The cabin climate control assembly may comprise a heating mode in which the cabin climate control assembly is configured to remove heat energy from air entering or circulating within a cabin of a working vehicle via the evaporator, then add the removed heat energy and additional heat energy generated by the compressor back into the air entering or circulating within the cabin via the heat exchanger, in order to raise the temperature of the cabin.

It will be understood that such a cabin climate control assembly is able to raise the temperature within the cabin of a working vehicle by creating a heating loop which removes heat energy from the cabin, adds additional heat energy generated through work done by the compressor (i.e. compressing the refrigerant), and returns the removed heat energy plus additional heat energy generated by the compressor into the cabin. In this way, the work done by the compressor acts as a source of heat generation in the system.

As heat energy is removed from air entering or circulating within the cabin via the evaporator, moisture in the air (e.g. moisture contained in humid air ingested into the cabin, and/or moisture present in the exhaled breath of an occupant of the cabin) will condense on the evaporator. This releases latent heat which is absorbed by the refrigerant and transferred from the first circuit to the second circuit, via the condenser, and back into the cabin, via the heat exchanger. In other words, latent heat is re-used as "sensible heat" to warm the cabin.

It will therefore be understood that the cabin climate control assembly provides an efficient means for heating the cabin by making use of two sources of heat which would otherwise be wasted (work done by compressor and latent heat due to condensation). This is particularly beneficial for electric working vehicles which do not have an internal combustion engine as a source of heat and where efficient use of power is desired.

In addition, the cabin climate control assembly provides an additional benefit of removing moisture from the air entering or circulating within the cabin (via condensation on the evaporator) which facilitates "de-misting" of the cabin (i.e. inhibiting or removing build-up of moisture on the windows of the cabin to provide good visibility). This differs from electrical resistance type cabin heaters (e.g. electric fan heaters) which are not able to remove moisture from the air entering or circulating within the cabin.

Having a de-misting effect is particularly beneficial for working vehicles, since the cabin of a working vehicle is typically smaller than other types of vehicles (e.g. cars) and has a comparatively larger proportion of the internal surface area covered by windows, which makes the cabin more susceptible to misting as a result of moisture contained in the exhaled breath of cabin occupants.

A further benefit of the cabin climate control assembly is that it allows the cabin to be heated with standard air conditioning components (i.e. refrigerant circuit, evaporator, compressor, condenser). For electric working vehicles which do not have a combustion engine as a source of heat, the re-purposing of standard air conditioning components in the cabin climate control assembly removes the need to use new heating components (e.g. resistive electrical components) which may be more expensive to install, use more energy (and thus reduce battery life) and/or require a completely different system architecture to standard air conditioning systems. In other words, the use of standard air conditioning components allows an existing production line for working vehicles (e.g. a production line for diesel vehicles having an air conditioning system) to be adapted more quickly and cheaply for producing new working vehicles with the cabin climate control assembly (e.g. electric working vehicles) than if alternative new heating components were used. This is particularly beneficial for working vehicles, which are generally produced in lower volumes than other vehicle types (e.g. cars), because tooling costs for lower volume production lines will have a greater impact on vehicle price than for higher volume production lines.

Optionally, the second circuit comprises a heater configured to raise a temperature of the liquid in the second circuit.

Such a heater can be used to supplement the heat generated through work done by the compressor and through re-use of latent heat. For example, when there is a large temperature differential between a desired temperature within the cabin and the temperature of air entering or circulating within the cabin, the heater may be used until this differential is reduced to an amount where the heat generated by the compressor and latent heat is sufficient to reach and maintain the desired cabin temperature.

It will be understood that when the heater is used to heat the liquid in the second circuit, some of this heat can, in certain operating conditions, be transferred via the condenser to the refrigerant in the first circuit. Therefore, the heater may also be used when it is required to heat the refrigerant in the first circuit to ensure proper functioning of the compressor and to avoid icing in the evaporator (e.g. when starting the working vehicle in a cold climate).

Optionally, the heater is an immersion heater contained within pipework of the second circuit such that liquid flowing through the second circuit contacts the immersion heater.

Such an immersion heater provides a simple and efficient means for raising a temperature of liquid circulating through the second circuit. In addition, an immersion heater provides a comparatively compact arrangement since it is contained within pipework of the second circuit (rather than as a jacket or other assembly outside of the pipework). Furthermore, having an immersion heater contained within the second circuit may keep high voltages out of the operator environment.

Optionally, the heater comprises electrical resistance element.

It will be understood that working vehicles will have a battery or other source of electrical power for starting the working vehicle, running vehicle electrics and driving propulsion/actuators of the working vehicle (in the case of electric or hybrid working vehicles). Therefore, having an electrical resistance element allows an existing source of power to be used for the heater. In addition, because an electrical resistance element only requires connection to electrical cabling, this provides flexibility in positioning of the heater.

It is known to use electrical resistance elements in positive temperature coefficient (PTC) heaters to directly heat air entering or circulating within the cabin. However, such PTC heaters are usually not electrically insulated. As it is common for users to "pressure wash" the inside of a working vehicle cabin (which results in water being sprayed throughout the cabin), there is a safety risk if the electrical resistance element of the PTC heater is not protected from such water spray. Therefore, having a heater with an electrical resistance element for heating liquid in the second circuit allows the electrical resistance element to be located outside of the cabin, which may provide a safer arrangement and/or mitigate the need for protecting parts of the cabin from water spray.

Optionally, the working vehicle is an electric or plug-in hybrid working vehicle and wherein the cabin climate control assembly is configured to run the heater when it is determined that the working vehicle is on charge.

Running the heater when the working vehicle is on charge allows the liquid in the second circuit to be heated prior to start-up of the working vehicle. This helps a desired cabin temperature to be reached more quickly when an operator starts the working vehicle.

In addition, heating of the liquid in the second circuit prior to start-up of the working vehicle may increase the temperature of refrigerant in the first circuit so that it is sufficient to ensure proper functioning of the compressor and avoid icing in the evaporator, even if the outside air temperature is low when the working vehicle is started.

Furthermore, running the heater when the working vehicle is on charge increases the run time of the working vehicle because it reduces the amount of energy stored by the working vehicle (e.g. in batteries) that has to be used for heating the cabin.

Optionally, the cabin climate control assembly is configured to run the heater when it is determined that a temperature differential between a desired cabin temperature and an outside air temperature or actual cabin temperature is greater than a threshold temperature differential.

It will be understood that a greater amount of heat energy will be required to maintain the desired cabin temperature when there is a larger temperature differential between the desired cabin temperature and the outside air temperature. It will also be understood that a greater amount of heat energy will be required in order to reach the desired cabin temperature within an acceptable timeframe when there is a large temperature differential between the desired cabin temperature and actual cabin temperature (or outside air temperature at start-up of the working vehicle).

Optionally, at start-up of the working vehicle, the cabin climate control assembly is configured to run the heater when it is determined that an outside air temperature is below a threshold air temperature.

It will be understood that the temperature of refrigerant in the first circuit and liquid in the second circuit will be approximately equal to the outside air temperature when the working vehicle is started after a long period (e.g. first thing in the morning after not being used overnight). Therefore, running the heater when the outside air temperature is below a threshold air temperature (e.g. less than 5° C.) at start-up of the working vehicle helps to heat the refrigerant in the first circuit to ensure proper functioning of the compressor and to avoid icing in the evaporator.

Optionally, the cabin climate control assembly is configured to turn off the heater when a temperature of the liquid in the second circuit is greater than a threshold liquid temperature.

It will be understood that once the liquid in the second circuit reaches a threshold liquid temperature (e.g. greater than 30° C.), the heat energy generated through work done by the compressor and re-use of latent heat may be sufficient to reach and maintain the desired cabin temperature. In addition, once the threshold liquid temperature is reached, the refrigerant in the first circuit will be at a sufficient temperature to ensure proper function of the compressor and avoid icing of the evaporator. Therefore, the cabin climate control assembly being configured to turn off the heater when the threshold liquid temperature is reached helps to save energy by not running the heater. In the case of an electric working vehicle, this reduced energy can result in increased run time.

Optionally, the cabin climate control assembly is configured to gradually reduce a heat output of the heater as the temperature of the liquid in the second circuit approaches the threshold liquid temperature.

Gradually reducing the heat output of the heater allows a reduction of energy supplied to the heater before the heater can be completely turned off, which leads to a reduction in the energy supplied to the heater in comparison to on/off control. This results in a corresponding increase in run time.

It will be understood that the gradual reduction in heat output may be a discrete (i.e. stepped) reduction (e.g. with one or more steps between "fully on" and "fully off" states of the heater) or a continuous reduction (e.g. a linear or exponential decrease).

In some embodiments, the cabin climate control assembly is configured to control the heat output of the heater by pulse width modulation. In other words, the heater may be turned on and off in pulses in order to provide a desired average heat output.

In some embodiments, the heat output of the heater is gradually reduced by gradually increasing the duration of the "off" pulses and gradually reducing the duration of "on pulses".

In some embodiments, the heat output of the heater is gradually reduced by gradually reducing a voltage supplied to the heater.

Optionally, the cabin climate control assembly further comprises one or more fans configured to direct air entering or circulating within the cabin towards the evaporator and/or heat exchanger.

Having one or more of such fans facilitates effective performance of the cabin climate control assembly by increasing the amount of heat that can be removed and subsequently put back into the cabin.

Optionally, the cabin climate control assembly further comprises a diverter configured to divert air which has been cooled by the evaporator outside of the cabin.

Such a diverter may improve heating performance by rejecting air that has been cooled by the evaporator and instead heating air that has not been cooled with the heat exchanger.

Optionally, the diverter is configured to be selectively actuated in order to divert air which has been cooled by the evaporator outside of the cabin or towards the heat exchanger.

The diverter being selectively actuatable provides a wider range of operating conditions for the cabin climate control assembly. For example, when less heating is required or when the cabin climate control assembly is used for cooling, the diverter may be actuated to divert air which has been cooled by the evaporator towards the heat exchanger. In contrast, when more heating is required, the diverter may be actuated to divert air which has been cooled by the evaporator outside of the cabin.

Optionally, the second circuit comprises a radiator external to the cabin and a valve arrangement configured to selectively direct liquid in the second circuit from the condenser towards the heat exchanger and/or the radiator.

Such a radiator and valve arrangement allow heat removed from the cabin to be released outside of the cabin when desired (e.g. when cooling the cabin).

Optionally, the cabin climate control assembly comprises a cooling mode in which the cabin climate control assembly is configured to remove heat energy from air entering or circulating within the cabin via the evaporator, then transfer the removed heat energy to an external environment via the radiator, in order to reduce the temperature of the cabin.

In this way, the cabin climate control assembly can provide the benefits of cooling as well as heating which allows a comfortable cabin temperature to be provided in a wider range of climates.

Optionally, the cabin climate control assembly comprises a mixed mode in which the cabin climate control assembly is configured to remove heat energy from air entering or circulating within the cabin via the evaporator, then transfer a first portion of the removed heat energy and additional heat energy generated by the compressor back into the air entering or circulating within the cabin via the heat exchanger and a second portion of the removed heat energy and additional heat energy generated by the compressor to an external environment via the radiator.

In this way, overheating of the cabin can be avoided by releasing some heat via the radiator. In addition, the mixed mode allows de-misting performance to be maintained even when the temperature is comfortable (i.e. where less heating is required).

Optionally, the ratio of the first and second portions is controlled by the valve arrangement in order to maintain a temperature within the cabin.

Controlling the ratio of the first and second portions by the valve arrangement provides a simple means of maintaining a desired cabin temperature. For example, when the cabin temperature drops the ratio of the first portion to the second portion is increased, and when the cabin temperature rises the ratio of the first portion to the second portion is decreased.

Optionally, the valve arrangement comprises a first valve configured to control flow of liquid in the second circuit between the condenser and the heat exchanger and a second valve configured to control flow of liquid in the second circuit from the condenser to the radiator.

Such valves provide a simple means for controlling flow of liquid in the second circuit.

In some embodiments, the first and second valves are proportional valves. This allows flow of liquid through the second circuit to be split proportionally between the heat exchanger and the radiator.

Optionally, the cabin climate control assembly further comprises a radiator fan configured to blow ambient air across the radiator.

Such a radiator fan increases the amount of heat that can be removed from the liquid in the second circuit at the radiator. This increases cooling performance of the cabin climate control assembly.

Optionally, the cabin climate control assembly further comprises an expansion device located in the first circuit between the condenser and the evaporator.

Optionally, the cabin climate control assembly further comprises a pump configured to circulate the liquid around the second circuit.

Optionally, the cabin climate control assembly further comprises a receiver drier in the first circuit to remove moisture and/or debris from refrigerant circulating in the first circuit; optionally, wherein the receiver drier is located between the condenser and the expansion device.

Having a receiver drier increases the performance of the first circuit by removing contaminants from the refrigerant. The receiver drier also acts as a reservoir of refrigerant, which increases the system's tolerance to refrigerant charge level.

A further aspect of the teachings provides a working vehicle comprising a cabin and a cabin climate control assembly as disclosed herein.

Such a working vehicle benefits from the advantages of the cabin climate control assembly outlined above.

Optionally, the working vehicle is an electric working vehicle or a plug-in hybrid working vehicle.

In this context, the term "electric working vehicle" may be understood to refer to a working vehicle in which all of the power for traction and working operations comes from electrical energy (e.g. electrical energy stored on the vehicle). The term "hybrid working vehicle" may be understood to refer to a working vehicle which stores electrical energy on the vehicle for providing power for traction and working operations, but which also has an internal combustion engine for powering the working vehicle (e.g. by powering traction and/or working operations directly, or by generating electrical energy for storage on the working vehicle and/or use for traction and working operations). The term "plug-in hybrid vehicle" may be understood to refer to a hybrid working vehicle which can be "plugged in" (i.e. put "on charge") in order to store electrical energy supplied by an external source (e.g. a mains electricity network) on the working vehicle.

It will be understood that the cabin climate control assembly provides an efficient means for heating the cabin by making use of two sources of heat which would otherwise be wasted (work done by compressor and latent heat due to condensation). This is particularly beneficial for electric working vehicles or plug-in hybrid working vehicles, since increased efficiency results in increased run time of the working vehicle.

Optionally, the working vehicle is an excavator or a telescopic handler.

A yet further aspect of the teachings provides a method of heating a cabin of a working vehicle, the method comprising:

a) transferring heat energy from air entering or circulating within a cabin of a working vehicle to refrigerant in a first circuit via an evaporator, b) compressing the refrigerant in the first circuit and thereby generating additional heat energy in the first circuit;

c) transferring heat energy from the compressed refrigerant to liquid in a second circuit via a condenser;

c) transferring heat energy from the liquid in the second circuit back into the air entering or circulating within the cabin via a heat exchanger, in order to raise the temperature of the cabin.

It will be understood that such a method can be used to raise the temperature within the cabin of a working vehicle by creating a heating loop which removes heat energy from the cabin, adds additional heat energy generated through work done by the compressor (i.e. compressing the refrigerant), and returns the removed heat energy plus additional heat energy generated by the compressor into the cabin. In this way, the work done by the compressor acts as a source of heat generation in the system.

As heat energy is removed from air entering or circulating within the cabin via the evaporator, moisture in the air (e.g. moisture contained in humid air ingested into the cabin, and/or moisture present in the exhaled breath of an occupant of the cabin) will condense on the evaporator. This releases latent heat which is absorbed by the refrigerant and transferred from the first circuit to the second circuit, via the condenser, and back into the cabin, via the heat exchanger. In other words, latent heat is re-used as "sensible heat" to warm the cabin.

It will therefore be understood that this method provides an efficient means for heating the cabin by making use of two sources of heat which would otherwise be wasted (work done by compressor and latent heat due to condensation). This is particularly beneficial for electric working vehicles which do not have an internal combustion engine as a source of heat and where efficient use of power is desired.

In addition, this method provides an additional benefit of removing moisture from the air entering or circulating within the cabin (via condensation on the evaporator) which facilitates "de-misting" of the cabin (i.e. inhibiting or removing build-up of moisture on the windows of the cabin to provide good visibility). This differs from electrical resistance type cabin heaters (e.g. electric fan heaters) which are not able to remove moisture from the air entering or circulating within the cabin.

Having a de-misting effect is particularly beneficial for working vehicles, since the cabin of a working vehicle is typically smaller than other types of vehicles (e.g. cars) and has a comparatively larger proportion of the internal surface area covered by windows, which makes the cabin more susceptible to misting as a result of moisture contained in the exhaled breath of cabin occupants.

A further benefit of this method is that it allows the cabin to be heated with standard air conditioning components (i.e. refrigerant circuit, evaporator, compressor, condenser). For electric working vehicles which do not have a combustion engine as a source of heat, the use of standard air conditioning components in the cabin climate control assembly removes the need to use new heaters based on resistive electrical components, which are expensive to install, use more energy (and thus reduce battery life) and which require a completely different system architecture to standard air conditioning systems. In other words, the use of standard air conditioning components allows an existing production line for working vehicles (e.g. a production line for diesel vehicles having an air conditioning system) to be adapted more quickly and cheaply for producing new working vehicles with the cabin climate control assembly (e.g. electric working vehicles) than if alternative new heating components were used. This is particularly beneficial for working vehicles, which are generally produced in lower volumes than other vehicle types (e.g. cars), because tooling costs for lower volume production lines will have a greater impact on vehicle price than for higher volume production lines.

BRIEF DESCRIPTION OF DRAWINGS

Embodiments will now be described by way of example only with reference to the accompanying figures, in which.

DETAILED DESCRIPTION

In the following detailed description, numerous specific details are set forth in order to provide a thorough understanding of various embodiments and the teachings. However, those skilled in the art will understand that: the present teachings may be practiced without these specific details or with known equivalents of these specific details; that the present teachings are not limited to the described embodiments; and, that the present teachings may be practiced in a variety of alternative embodiments. It will also be appreciated that well known methods, procedures, components, and systems may not have been described in detail.

Figure 1:
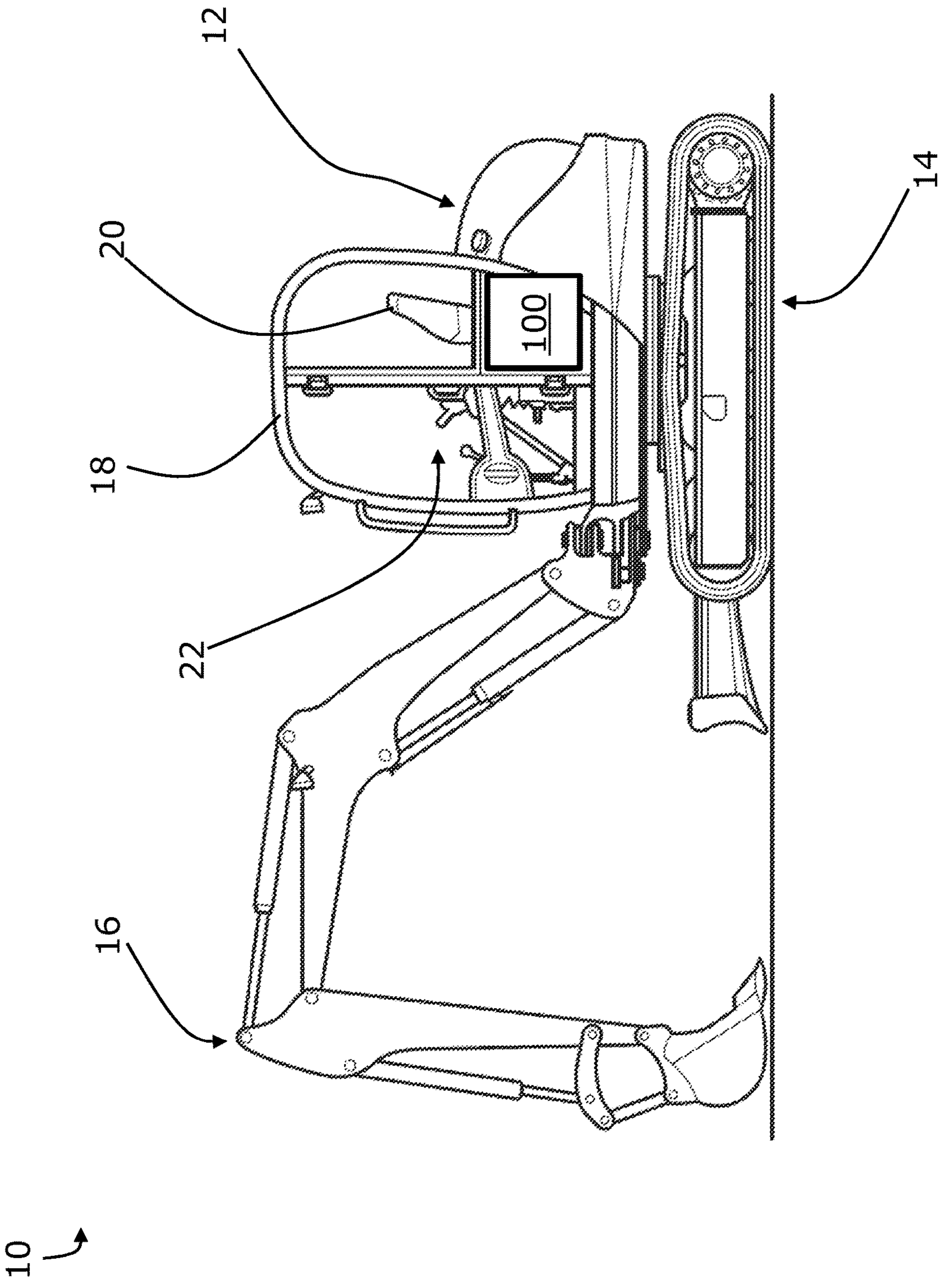
FIG. 1 is a side view of a working vehicle according to an embodiment.

With reference to FIG. 1, a working vehicle is indicated at 10. The working vehicle 10 includes a machine body 12, a ground engaging propulsion structure 14, a working arm 16, and a cabin 18. The cabin 18 has a seat 20 for an operator and user controls 22 for controlling movement of the ground engaging propulsion structure 14 and working arm 16. As will be described in more detail below, the working vehicle 10 has a cabin climate control assembly 100 for controlling the climate (e.g. temperature and humidity) within the cabin 18.

Although not illustrated, it will be understood that the working vehicle 10 has a means of driving the ground engaging propulsion structure 14 and working arm 16 (e.g. an internal combustion engine and/or at least one electric motor and electric energy storage device, such as a battery). In some embodiments, the working vehicle 10 is an electric working vehicle. In other words, the working vehicle 10 may have no internal combustion engine and may instead be driven exclusively by one or more electric motors powered by a suitable electric energy storage device (e.g. one or more batteries and hydrogen fuel cells). In other embodiments, the working vehicle 10 is a hybrid working vehicle having both an internal combustion engine and one or more electric motors.

In the illustrated embodiment, the working vehicle 10 is an excavator. In alternative embodiments, the working vehicle 10 may be a different type of vehicle, such as a telescopic handler, backhoe loader, loader, dumper, skid steer loader etc.

Figure 2:
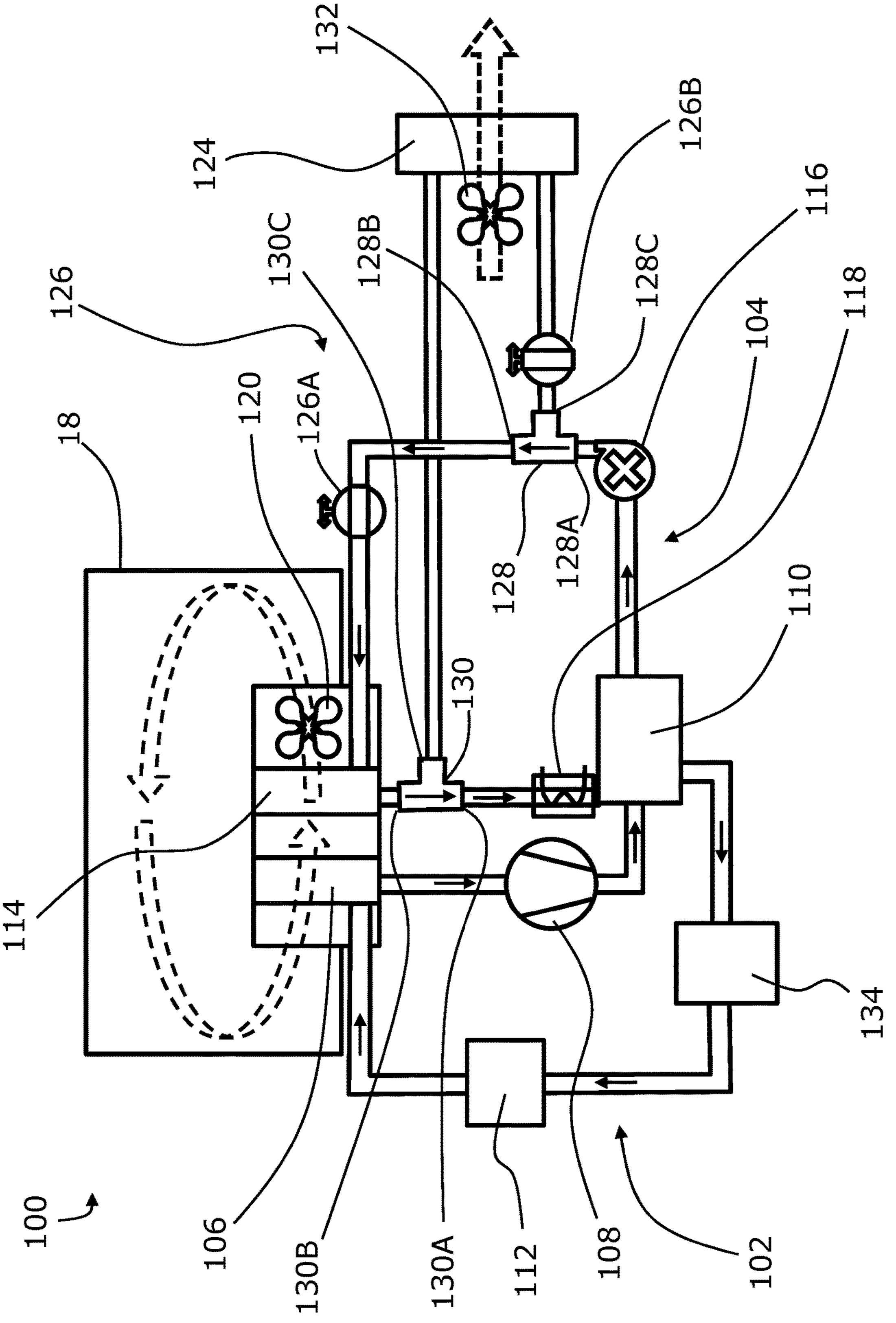
FIG. 2 is a schematic view of a cabin climate control assembly according to an embodiment, in a heating mode.
Figure 3:
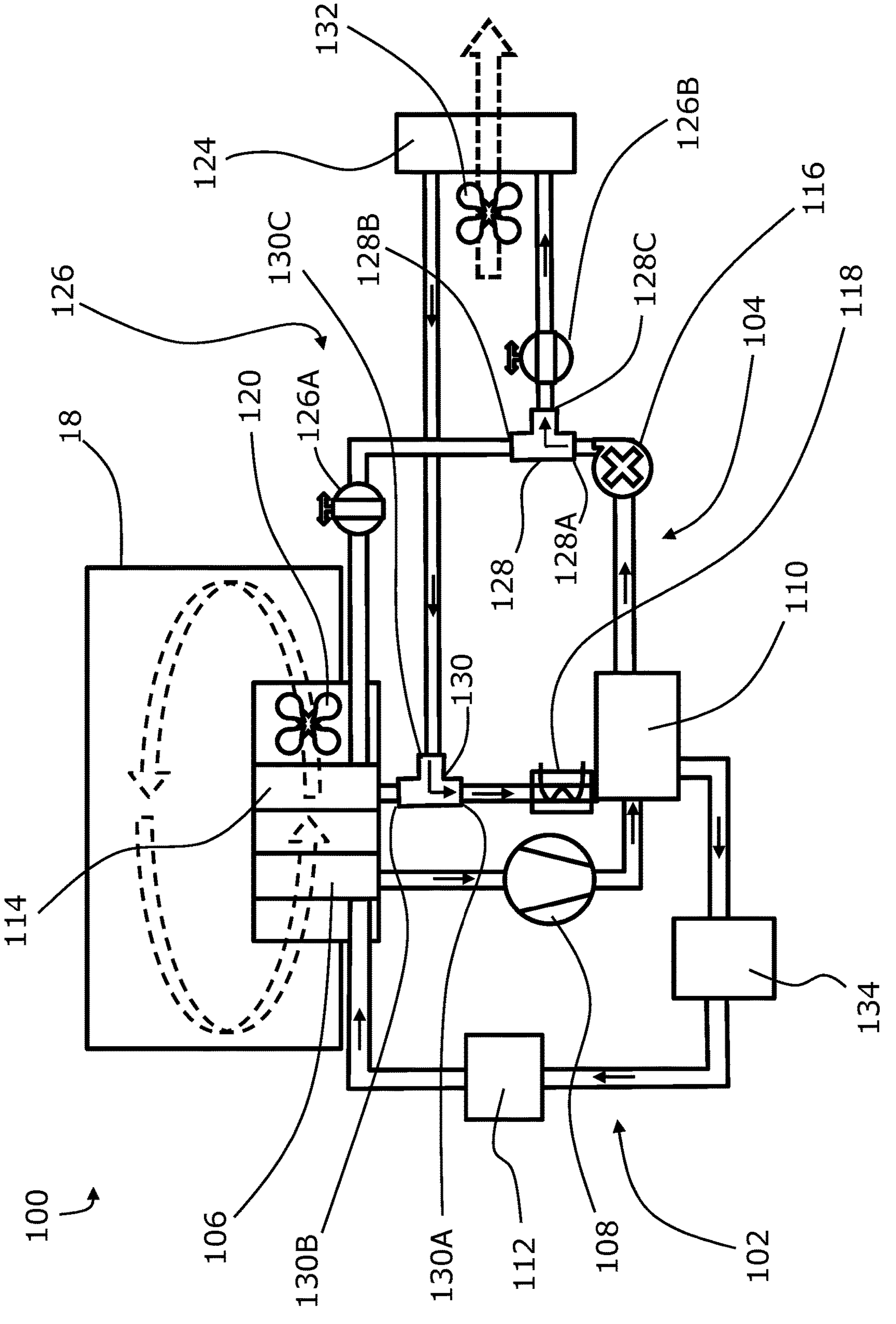
FIG. 3 is a schematic view of the cabin climate control assembly of FIG. 2, in a cooling mode.
Figure 4:
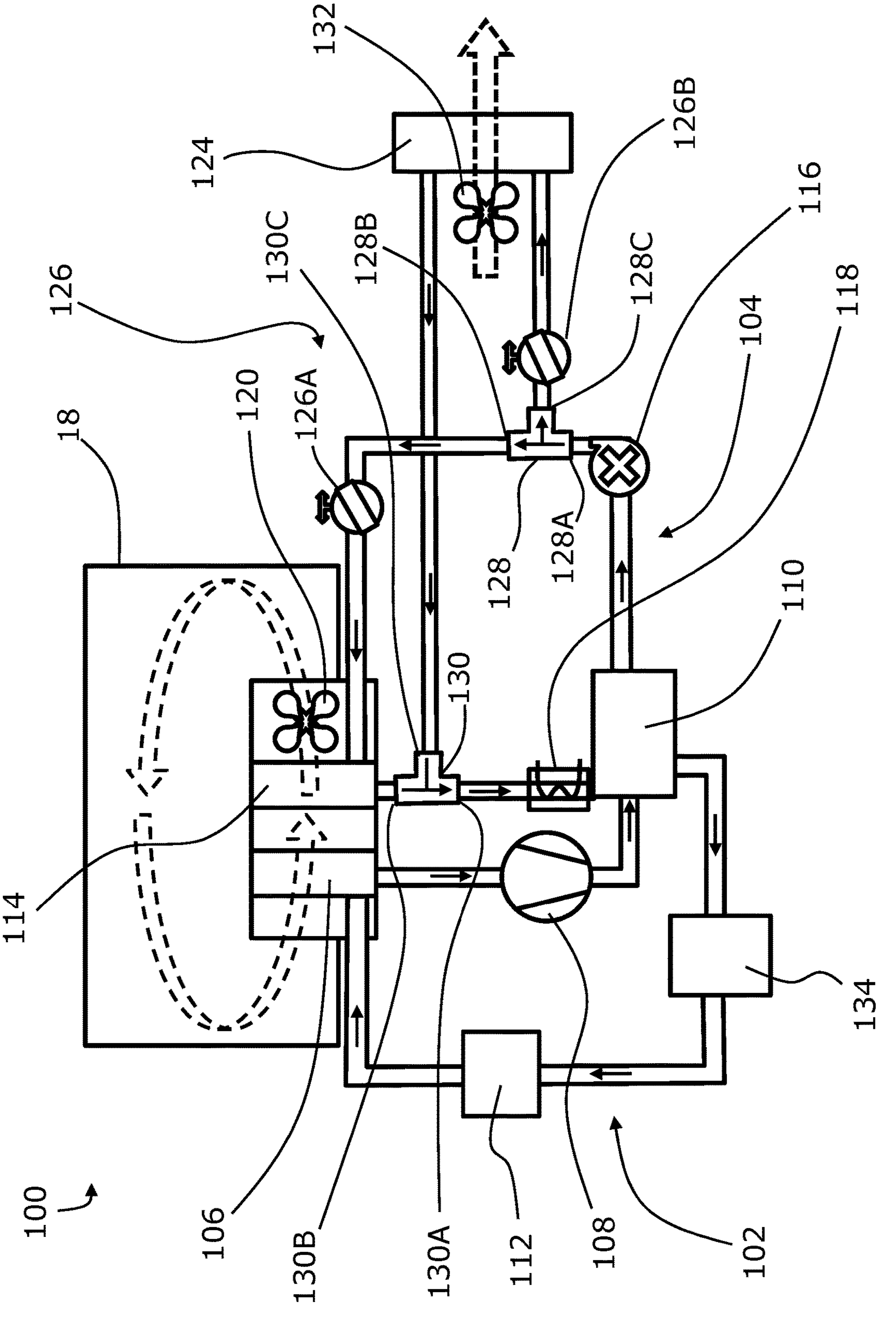
FIG. 4 is a schematic view of the cabin climate control assembly of FIGS. 2 and 3, in a mixed mode.

Referring now to FIGS. 2 to 4, the cabin climate control assembly 100 is illustrated in more detail. The cabin climate control assembly 100 has a first circuit 102 for circulating a refrigerant (e.g. a suitable refrigerant such as R134a or R1234yf), and a second circuit 104 for circulating a liquid (e.g. a heat transfer fluid or coolant such as a water-ethylene-glycol mix or other similar fluids).

The first circuit 102 includes: an evaporator 106 configured to transfer heat energy to the refrigerant; a compressor 108 configured to compress the refrigerant and thereby generate additional heat energy in the first circuit 102; a condenser 110 configured to release heat energy from the compressed refrigerant; and an expansion device 112 between the condenser 110 and the evaporator 106. The components of the first circuit 102 are arranged so that refrigerant can flow in a circuit from the evaporator 106 to the compressor 108, from the compressor 108 to the condenser 110, from the condenser 110 to the expansion device 112, and from the expansion device 112 back to the evaporator 106. Such a first circuit 102 is known in air conditioning systems for removing heat energy from an internal environment proximal to the evaporator 106 and releasing heat energy to an external environment at the condenser 110.

The second circuit 104 includes a heat exchanger 114 configured to expel heat energy from the liquid in the second circuit 104, and the condenser 110. The condenser 110 includes a first flow path for the refrigerant in the first circuit 102 and a separate second flow path for the liquid in the second circuit 104, so that the refrigerant and liquid do not mix. The components of the second circuit 104 are arranged so that liquid can flow in a circuit from the condenser 110 to the heat exchanger 114 and from the heat exchanger 114 back to the condenser 110. In the illustrated embodiment, the cabin climate control assembly 110 has a pump 116 configured to circulate the liquid in this way around the second circuit 104.

As the condenser 110 forms part of both the first and second circuits 102, 104, the condenser 110 is configured to transfer heat energy between the refrigerant in the first circuit 102 and the liquid in the second circuit 104. It will be understood that, when the compressed refrigerant flowing through the first flow path of the condenser 110 is warmer than the liquid flowing through the second flow path of the condenser 110, heat energy will be transferred from the refrigerant to the liquid. This heat energy can then be expelled by the heat exchanger 114. On the contrary, when the compressed refrigerant flowing through the first flow path of the condenser 110 is cooler than the liquid flowing through the second flow path of the condenser 110, heat energy will be transferred from the liquid in the second circuit 104 to the refrigerant in the first circuit 102.

FIG. 2 illustrates a heating mode of the cabin climate control assembly 100. In this heating mode, the cabin climate control assembly 100 is configured to remove heat energy from air entering or circulating within the cabin 18 via the evaporator 106, and then add the removed heat energy and additional heat energy generated by the compressor 108 back into the air entering or circulating within the cabin 18 via the heat exchanger 114, in order to raise the temperature of the cabin 18.

In more detail, the evaporator 106 is positioned so that air entering or circulating within the cabin 18 (illustrated by the dashed arrows within the cabin 18 on FIGS. 2 to 4) comes into contact with the evaporator 106, which reduces the temperature of the air entering or circulating within the cabin 18 by transferring heat energy to the refrigerant in the evaporator 106. The refrigerant is then compressed by the compressor 108 which adds additional heat energy in the first circuit 102. The compressed refrigerant in the first circuit 102 then flows through the condenser 110 and transfers the removed and generated heat energy from the refrigerant to the liquid in the second circuit 104. The liquid in the second circuit 104 then flows from the condenser 110 to the heat exchanger 114 where the heat energy removed by the evaporator and the additional heat energy generated by the compressor 108 is expelled to heat the air entering or circulating within the cabin 18.

In other words, it will be understood that such a heating mode of the cabin climate control assembly 100 is able to raise the temperature within the cabin 18 by creating a heating loop which removes heat energy from the cabin 18, adds additional heat energy generated through work done by the compressor 108 (i.e. compressing the refrigerant), and returns the removed heat energy plus additional heat energy generated by the compressor 108 into the cabin 18. In this way, the work done by the compressor 108 acts as a source of heat generation in the system.

As heat energy is removed from air entering or circulating within the cabin 18 via the evaporator 106, moisture in the air (e.g. moisture contained in humid air ingested into the cabin 18, and/or moisture present in the exhaled breath of an occupant of the cabin 18) will condense on the evaporator 106. This releases latent heat which is absorbed by the refrigerant and transferred from the first circuit 102 to the second circuit 104, via the condenser 110, and back into the cabin 18, via the heat exchanger 114. In other words, latent heat is re-used as "sensible heat" to warm the cabin 18.

It will therefore be understood that the heating mode of the cabin climate control assembly 100 provides an efficient means for heating the cabin by making use of two sources of heat which would otherwise be wasted (work done by the compressor 108 and latent heat due to condensation on the evaporator 106). This is particularly beneficial when the working vehicle 10 is an electric working vehicle, which does not have an internal combustion engine as a source of heat and where efficient use of power is desired.

In addition, the cabin climate control assembly 100 provides an additional benefit of removing moisture from the air entering or circulating within the cabin 18 (via condensation on the evaporator 106) which facilitates "de-misting" of the cabin 18. In other words, this removal of moisture may inhibit or remove build-up of moisture on the windows of the cabin 18 to provide good visibility. Having a de-misting effect is particularly beneficial for working vehicles, since the cabin 18 of the working vehicle 10 is typically smaller than other types of vehicles (e.g. cars) and has a comparatively larger proportion of the internal surface area covered by windows, which makes the cabin 18 more susceptible to misting as a result of moisture contained in the exhaled breath of cabin occupants.

A further benefit of the cabin climate control assembly 100 is that it allows the cabin to be heated with standard air conditioning components (i.e. the first circuit 102 for refrigerant, evaporator 106, compressor 108, condenser 110, expansion device 112). In embodiments where the working vehicle 10 is an electric working vehicle which does not have a combustion engine as a source of heat, the re-purposing of standard air conditioning components in the cabin climate control assembly 100 removes the need to use new heating components (e.g. resistive electrical components) which may be more expensive to install, use more energy (and thus reduce battery life) and/or require a completely different system architecture to standard air conditioning systems. In other words, the use of standard air conditioning components allows an existing production line for working vehicles (e.g. a production line for diesel vehicles having an air conditioning system) to be adapted more quickly and cheaply for producing the working vehicle 10 with the illustrated cabin climate control assembly 100 (e.g. electric working vehicles) than if alternative new heating components were used. This is particularly beneficial for working vehicles, which are generally produced in lower volumes than other vehicle types (e.g. cars), because tooling costs for lower volume production lines will have a greater impact on vehicle price than for higher volume production lines.

In the illustrated embodiment, the second circuit 104 also has a heater 118 configured to raise a temperature of the liquid in the second circuit 104. As will be described in more detail below, the heater 118 can be used to supplement the heat generated through work done by the compressor 108 and through re-use of latent heat, when required. For example, the heater 118 can be used to "kick-start" the heating loop by raising the temperature of liquid in the second circuit 104 until it is sufficient to warm the cabin 18 using only the heat generated by the compressor 108 and re-use of latent heat.

It will be understood that when the heater 118 is used to heat the liquid in the second circuit 104, some of this heat can, in certain operating conditions, be transferred via the condenser 110 to the refrigerant in the first circuit 102. Therefore, the heater 118 may also be used when it is required to heat the refrigerant in the first circuit 102 to ensure proper functioning of the compressor 108 and to avoid icing in the evaporator 106 (e.g. when starting the working vehicle 10 in a cold climate).

In the illustrated embodiment, the heater 118 is an immersion heater contained within pipework of the second circuit 104 such that liquid flowing through the second circuit 104 contacts the immersion heater 118. In alternative embodiments, the heater 118 is a jacket or other assembly outside of the pipework of the second circuit 104.

In the illustrated embodiment, the heater 118 has an electrical resistance element. In alternative embodiments, the heater 118 is a different type of heater (e.g. a coiled pipe which receives a flow of heating liquid which has been heated elsewhere).

In some embodiments, the heater 118 is omitted. For example, in cases where the working vehicle 10 is to be predominantly used in a warm climate (e.g., in countries close to the equator), the heat generated by the compressor 108 and re-use of latent heat may be sufficient to warm the cabin 18 when occasional light heating is required. Thus, the heater 118 may not be needed in such climates.

In some embodiments, the cabin climate control assembly 100 has one or more cabin fans 120 configured to direct air entering or circulating within the cabin 18 towards the evaporator 106 and/or the heat exchanger 114. Such one or more cabin fans 120 facilitate effective performance of the cabin climate control assembly 100 by increasing the amount of heat energy that can be removed and/or put back into the cabin 18.

In the embodiment of FIG. 2, a single cabin fan 120 is provided. The cabin fan 120 is provided downstream of the heat exchanger 114 so that air circulating within the cabin 18 is drawn past the evaporator 106 (and cooled) and then past the heat exchanger 114 (and heated) before circulating back through the cabin 18. A similar effect may be provided by positioning the cabin fan 120 upstream of the evaporator 106 or between the evaporator 106 and the heat exchanger 114.

Figure 5A:
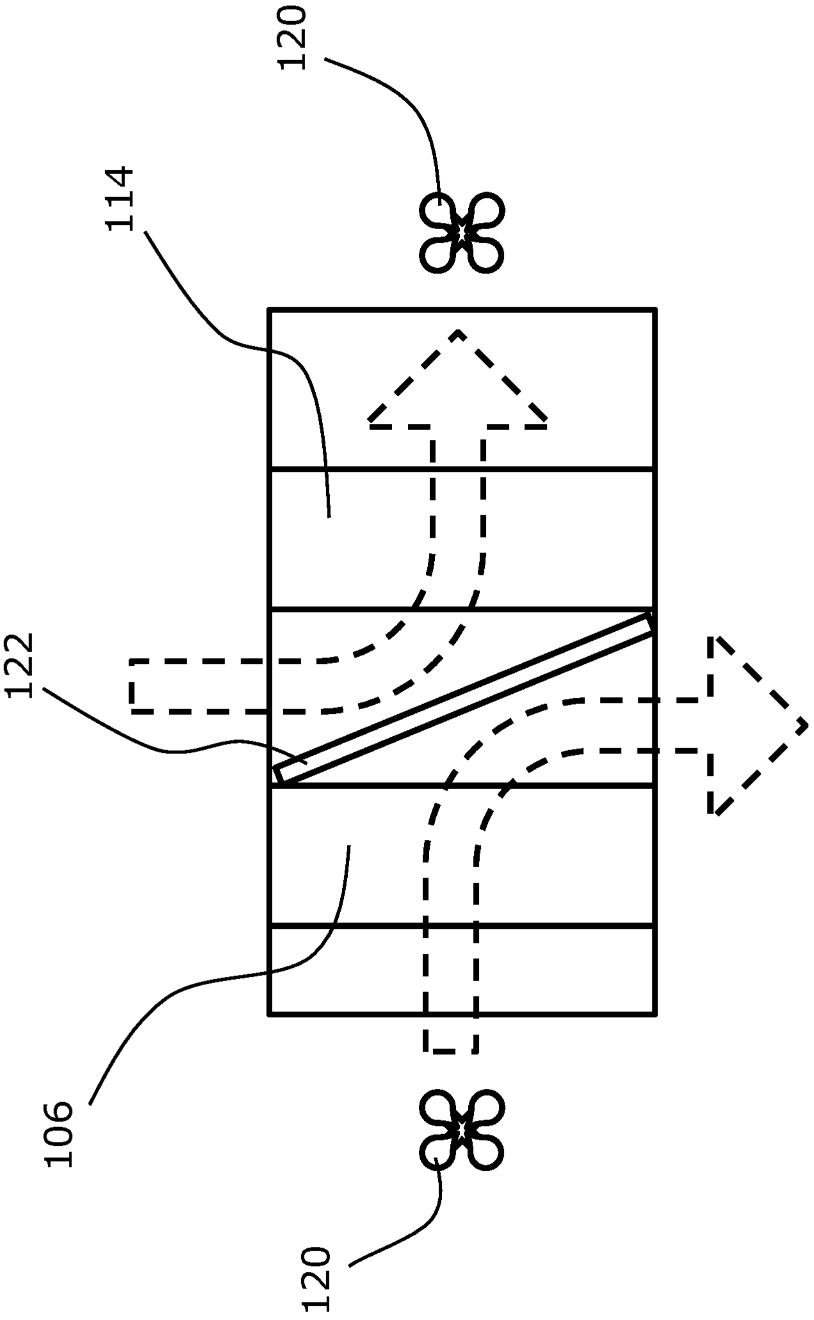
FIG. 5*a* is a schematic view of an evaporator, diverter and heat exchanger of a cabin climate control assembly according to an embodiment.

In some embodiments, the cabin climate control assembly 100 has a diverter 122 configured to divert air which has been cooled by the evaporator 106 outside of the cabin 18 (e.g., as illustrated in FIG. 5*a*). Such a diverter 122 may improve heating performance by rejecting air that has been cooled by the evaporator 106 and instead heating air that has not been cooled using the heat exchanger 114. In such embodiments, multiple cabin fans 120 may be provided. For example, a first cabin fan 120 may be provided to direct air across the evaporator 106 towards a first side of the diverter 122, and a second cabin fan 120 may be provided to direct air across the heat exchanger 114 and into the cabin 18. In alternative embodiments, the cabin climate control assembly 100 has a diverter 122 and a single cabin fan 120. In other words, it is not necessary to have multiple cabin fans 120 to achieve the effect of rejecting air that has been cooled by the evaporator 106 and instead heating air that has not been cooled using the heat exchanger 114.

In some embodiments, the diverter 122 can be selectively actuated (e.g. via one or more valves or other actuators) in order to divert air which has been cooled by the evaporator 106 outside of the cabin 18 or towards the heat exchanger 114. The diverter 122 being selectively actuatable provides a wider range of operating conditions for the cabin climate control assembly 100. For example, when less heating is required or when the cabin climate control assembly is used for cooling (as described below), the diverter 122 may be actuated to divert air which has been cooled by the evaporator towards the heat exchanger 114 and subsequently into the cabin 18. In contrast, when more heating is required, the diverter 122 may be actuated to divert air which has been cooled by the evaporator 106 outside of the cabin 18.

Figure 5B:
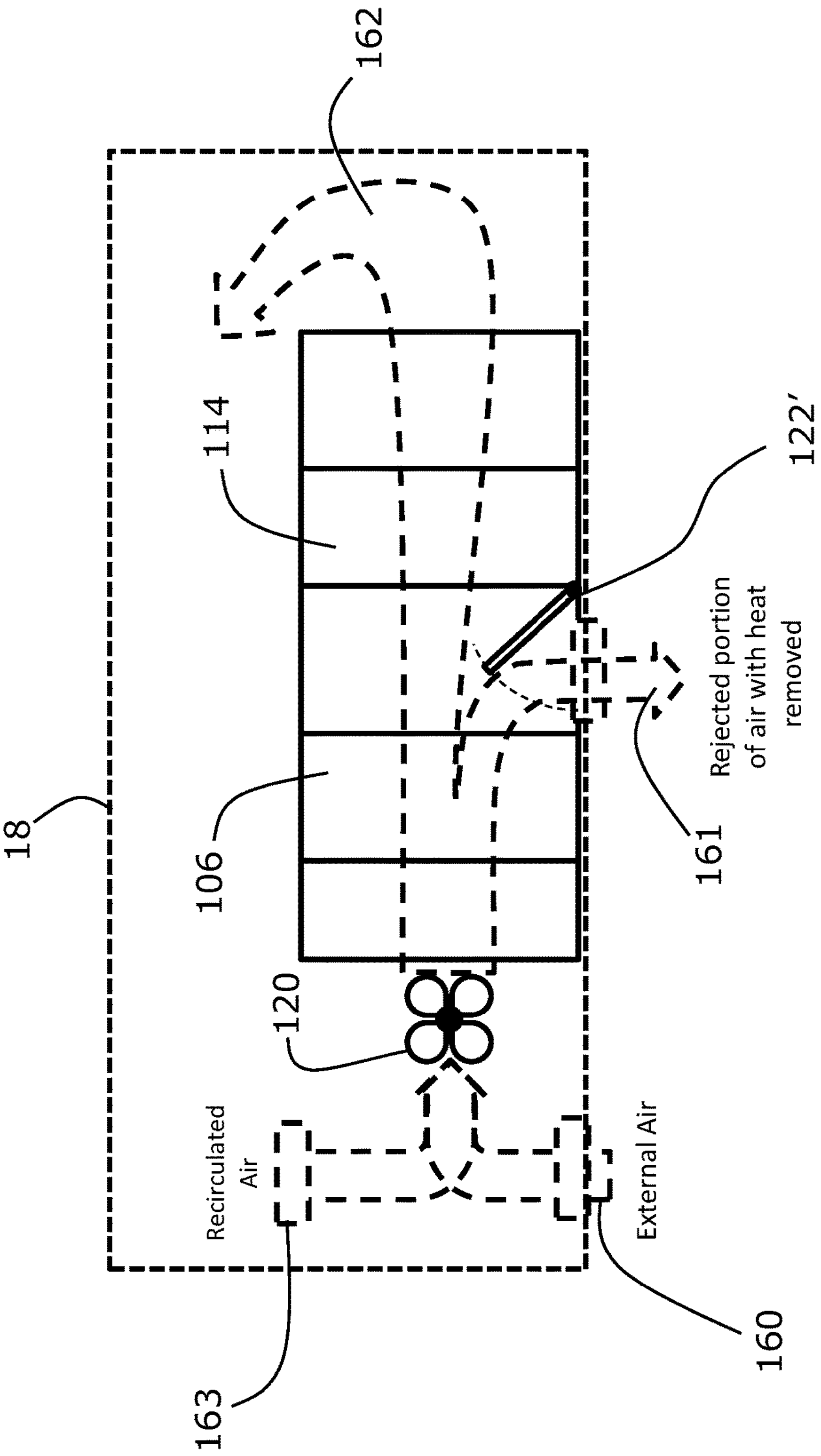
FIG. 5*b* is a schematic view of an evaporator, diverter and heat exchanger of a cabin climate control assembly according to a further embodiment.

FIG. 5*b* shows an alternative embodiment in which a diverter 122' may be utilized to capture heat from external air 160 using the evaporator 106, prior to expelling the cooled external air 161 to the exterior of the cabin 18. The captured heat may be used to heat recirculating air within the cabin 18 thereby allowing the cabin 18 to be heated more efficiently.

Diverter 122' may be selectively actuated so as to alter the amount of cooled external air 161 which is diverted to the exterior of the cabin 18 relative to the retained external air 162 which is sent back into the cabin 18 via the heat exchanger 114. In this way, a portion of ingested external air 160 may bypass the diverter 122' and be used to introduce fresh air to the cabin 18, whilst a further portion is used to provide heat extracted via the evaporator 106 and used to heat the cabin 18.

The diverter 122' may also include a second inlet 163 to allow air to pass over the evaporator 106 from in the interior of the cabin 18, with that air being either rejected to the exterior or recirculated, as described previously.

More specifically, the diverter 122' may comprise a first inlet in fluid communication with the exterior of the cabin and/or a second inlet in fluid communication with an interior of the cabin. Each inlet may be selectively actuated to receive air and direct it to the evaporator 106 using, for example, a fan 120 (as shown in FIG. 5*a* or 5*b*). The diverter 122' may be configured to direct cooled external air 163 to an external outlet to outside cabin, and to direct air towards the interior of the cabin 18 via the heat exchanger 114.

The flow path for exhausting air to the exterior of the cabin 18 may be provided downstream of the evaporator 106 and upstream of the heater 114 and comprise a suitable valve for controlling the flow.

The diverter 122' may also be used to equalize the cabin pressure and the pressure external to the cabin.

Referring still to FIGS. 2 to 4, the second circuit 104 includes a radiator 124 external to the cabin 18 and a valve arrangement 126 configured to selectively direct liquid in the second circuit 104 from the condenser 110 towards the heat exchanger 114 and/or the radiator 124.

In the illustrated embodiment, the second circuit 104 has a flow-splitting junction 128 with an inlet 128A for receiving liquid flowing from the condenser 110, a first outlet 128B for supplying liquid to the heat exchanger 114, and a second outlet 128C for supplying liquid to the radiator 124. The second circuit 104 also has a flow-converging junction 130 with a first inlet 130B for receiving liquid from the heat exchanger 114, a second inlet 130C for receiving liquid from the radiator 124, and an outlet 130A for supplying liquid from the heat exchanger 114 and/or radiator to the condenser 110.

The valve arrangement 126 has a first valve 126A downstream of the first outlet 128B of the flow-splitting junction 128 (i.e. between the first outlet 128B of the flow-splitting junction 128 and the first inlet 130B of the flow-converging junction 130), and a second valve 126B downstream of the second outlet 128C of the flow-splitting junction 128 (i.e. between the second outlet 128C of the flow-splitting junction 128 and the second inlet 130C of the flow-converging junction 130). The first valve 126A is configured to control flow of liquid in the second circuit 104 between the condenser 110 and the heat exchanger 114, and the second valve 126B is configured to control flow of liquid in the second circuit 104 from the condenser 110 to the radiator 124.

In the illustrated embodiment, the first and second valves 126A, 126B are provided upstream of the respective heat exchanger 114 and radiator 124. In alternative embodiments, the first and second valves 126A, 126B are provided downstream of the respective heat exchanger 114 and radiator 124.

In the heating mode of FIG. 2, the first valve 126A is fully open and the second valve 126B is fully closed, so that all of the liquid in the second circuit 104 flowing from the condenser 110 is supplied to the heat exchanger 114 in order to heat the air entering or circulating within the cabin 18.

FIG. 3 illustrates a cooling mode of the cabin climate control assembly 100. In this cooling mode, the cabin climate control assembly 100 is configured to remove heat energy from air entering or circulating within the cabin 18 via the evaporator 106, then transfer the removed heat energy to an external environment via the radiator 124, in order to reduce the temperature of the cabin 18. This is achieved by setting the first valve 126A to a fully closed position and the second valve 126B to a fully open position, so that all of the liquid in the second circuit 104 flowing from the condenser 110 is supplied to the radiator 124 in order to release heat energy to the external environment. In the cooling mode illustrated in FIG. 3, the cabin climate control assembly 100 can provide the benefits of cooling (in addition to the heating mode of FIG. 2), which allows a comfortable cabin temperature to be provided in a wider range of climates.

FIG. 4 illustrates a mixed mode of the cabin climate control assembly 100. In this mixed mode, the cabin climate control assembly 100 is configured to remove heat energy from air entering or circulating within the cabin 18 via the evaporator 106, then transfer a first portion of the removed heat energy and additional heat energy generated by the compressor 108 back into the air entering or circulating within the cabin 18 via the heat exchanger 114, and a second portion of the removed heat energy and additional heat energy generated by the compressor 108 to an external environment via the radiator 124. This is achieved by setting the first and second valves 126A, 126B to intermediate positions between fully open and fully closed positions, so that the liquid in the second circuit 104 flowing from the condenser 110 is split between the flow path to the heat exchanger 114 and the flow path to the radiator 124. In this way, overheating of the cabin 18 can be avoided by releasing some heat via the radiator 124. In addition, the mixed mode allows de-misting performance to be maintained even when the temperature is comfortable (i.e. where less heating is required).

In some embodiments, the ratio of the first and second portions is controlled by the valve arrangement 126 in order to maintain a temperature within the cabin 18. For example, when the cabin temperature drops the ratio of the first portion to the second portion is increased (i.e. the proportion of liquid flowing from the condenser 110 to the heat exchanger 114 is increased), and when the cabin temperature rises the ratio of the first portion to the second portion is decreased (i.e. the proportion of liquid flowing from the condenser to the radiator 124 is increased).

In some embodiments, the first and second valves 126A, 126B are proportional valves. In other words, the first and second valves 126A, 126B can operate at any point between fully open and fully closed positions.

In the illustrated embodiment, the cabin climate control assembly 100 also includes a radiator fan 132 configured to blow ambient air across the radiator 124. This increases the amount of heat that can be removed from the liquid in the second circuit 104 at the radiator 124 and thus increases cooling performance of the cabin climate control assembly 100.

In some embodiments, the cabin climate control assembly 100 is configured to run the radiator fan 132 only when the second valve 126B is at least partially open. In this way, energy isn't wasted running the radiator fan 132 when liquid isn't circulating through the radiator 124.

In the illustrated embodiment, the cabin climate control assembly 100 has a receiver drier 134 in the first circuit 102 to remove moisture and/or debris from refrigerant circulating in the first circuit 102. In particular, there is a receiver drier 134 located between the condenser 110 and the expansion device 112. The receiver drier 134 increases the performance of the first circuit 102 by removing contaminants from the refrigerant.

Figure 6:
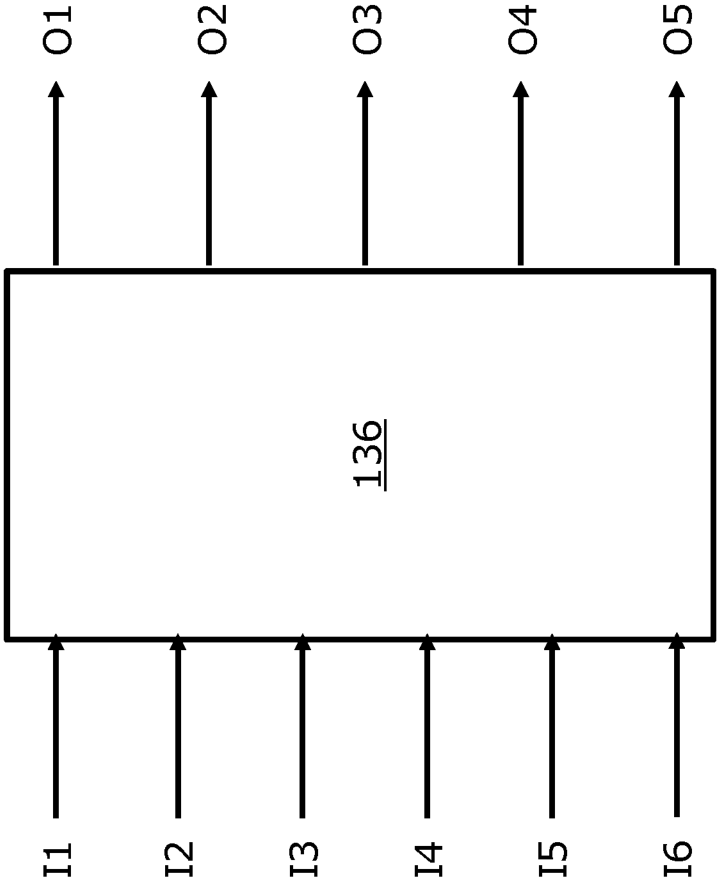
FIG. 6 is a schematic view of a controller and associated inputs and outputs of a cabin climate control assembly, according to an embodiment.

FIG. 6 illustrates a controller 136 for the cabin climate control assembly 100. The controller 136 receives inputs I1 to I6, determines which components of the cabin climate control assembly 100 need to be actuated, and sets output signals O1 to O5 accordingly.

I1 is an input which is present when the working vehicle 10 is an electric or plug-in hybrid working vehicle. I1 indicates whether the working vehicle 10 is on charge or not. I1 may be a direct charge status signal with on/off states indicative of a charger being connected or not. Alternatively, I1 may be an indirect signal and the charge status may be determined by the controller 136. For example, I1 may be a signal indicative of a level of charge in an electric energy storage device and when the controller 136 detects that the level of charge is increasing, it may be determined that the working vehicle 10 is on charge.

I2 is an input which indicates start-up of the working vehicle 10. I2 may be a direct signal sent in response to a request to start the working vehicle 10 (e.g., by turning a key or pressing a button). Alternatively, I2 may be an indirect signal and the start-up of the working vehicle may be determined by the controller 136. For example, I2 may be a signal indicative of a level of charge in an electric energy storage device and when the controller detects that the level of charge starts decreasing more quickly, it may be determined that the working vehicle 10 has been started.

I3 is an input indicative of a desired cabin temperature. I3 may be received as a signal from one of the user controls 22 within the cabin 18 (e.g. a temperature dial or similar control). Alternatively, I3 may be received remotely/wirelessly (e.g. the desired temperature may be set in a phone application or other device independent of the working vehicle 10).

I4 is an input indicative of an outside air temperature. I4 may be received as a signal from a temperature sensor located external to the cabin 18. Alternatively, I4 may be received from another source (e.g. weather data from an external source).

I5 is an input indicative of an actual cabin temperature. I5 may be received as a signal from a temperature sensor located inside the cabin 18.

I6 is an input indicative of a temperature of the liquid in the second circuit 104. I6 may be received as a signal from a temperature sensor located within or proximal to the second circuit 104.

O1 is a signal for actuating the compressor 108, pump 116 and cabin fan 120. Generally, the compressor 108, pump 116 and cabin fan 120 will all run simultaneously when the cabin climate control assembly is running and so O1 may be a single output. Alternatively, O1 may be provided as separate signals to each of the compressor 108, pump 116 and cabin fan 120. The controller 136 may set O1 to run the compressor 108, pump 116 and/or cabin fan 120 whenever it is detected from input I2 that the working vehicle has been started. Alternatively, O1 may only be set to run these components when an additional input indicating a desire to run the cabin climate control assembly 100 is received. For example, the controller 136 may determine from input I3 when it is desired to run the cabin climate control assembly 100 and then set O1 accordingly.

O2 and O3 are signals for controlling the states of the first and second valves 126A, 126B, respectively. The controller 136 sets the values of O2 and O3 depending on how much heating or cooling is required. For example, the controller 136 may determine from inputs I3, I4 and/or I5 how much heating or cooling is required, and set O2 and O3 accordingly.

O4 is a signal for running the heater 118. O4 may be set by the controller 136 in accordance with the methods described below in relation to FIGS. 7 to 9.

O5 is a signal for running the radiator fan 132. O5 may be set by the controller 136 whenever O3 is set so that the second control valve 126B is at least partially open.

In embodiments where the working vehicle 10 is an electric or plug-in hybrid working vehicle, it will be understood that the working vehicle 10 may be connectable to a mains electricity charger in order to re-charge an electric energy storage device of the working vehicle 10 (e.g. one or more batteries). In such embodiments, the cabin climate control assembly 100 may be configured to run the heater 118 when it is determined that the working vehicle 10 is on charge. In other words, when the controller 136 determines from input I1 that the working vehicle 10 is on charge, it may set output O4 in order to run the heater 118. Running the heater 118 when the working vehicle 10 is on charge allows the liquid in the second circuit 104 to be heated prior to start-up of the working vehicle 10. This helps a desired cabin temperature to be reached more quickly when an operator starts the working vehicle 10. In addition, heating of the liquid in the second circuit 104 while the working vehicle 10 is on charge (i.e. prior to start-up of the working vehicle 10) may increase the temperature of refrigerant in the first circuit 102 so that it is sufficient to ensure proper functioning of the compressor 108 and avoid icing in the evaporator 106, even if the outside air temperature is low when the working vehicle 10 is started. Furthermore, running the heater 118 when the working vehicle 10 is on charge increases the run time of the working vehicle 10 because it reduces the amount of energy stored by the working vehicle 10 (e.g. in batteries) that has to be used for heating the cabin 18.

When the outside air temperature is high, it may not be necessary to heat the cabin 18 and the refrigerant in the first circuit 102 may be warm enough for the compressor 108 to function properly and to avoid icing in the evaporator 106.

Therefore, in some embodiments the cabin climate control assembly 100 is only configured to run the heater 118 during charging of the working vehicle 10 if the outside air temperature is below a threshold air temperature (e.g. below 5° C.). In other words, the controller 136 may only set output O4 to run the heater 118 if it is determined from inputs I1 and I4 that the working vehicle 10 is on charge and the outside air temperature is below the threshold air temperature. In alternative embodiments, the heater 118 may be run when the working vehicle 10 is on charge regardless of outside air temperature.

In some embodiments, the heater 118 may be turned off during charging of the working vehicle 10 when the liquid temperature is above a threshold liquid temperature (e.g. above 50° C.). In other words, the controller 136 may set output O4 to turn off the heater 118 if it is determined from input I6 that the liquid temperature is above the threshold liquid temperature.

Figure 7:
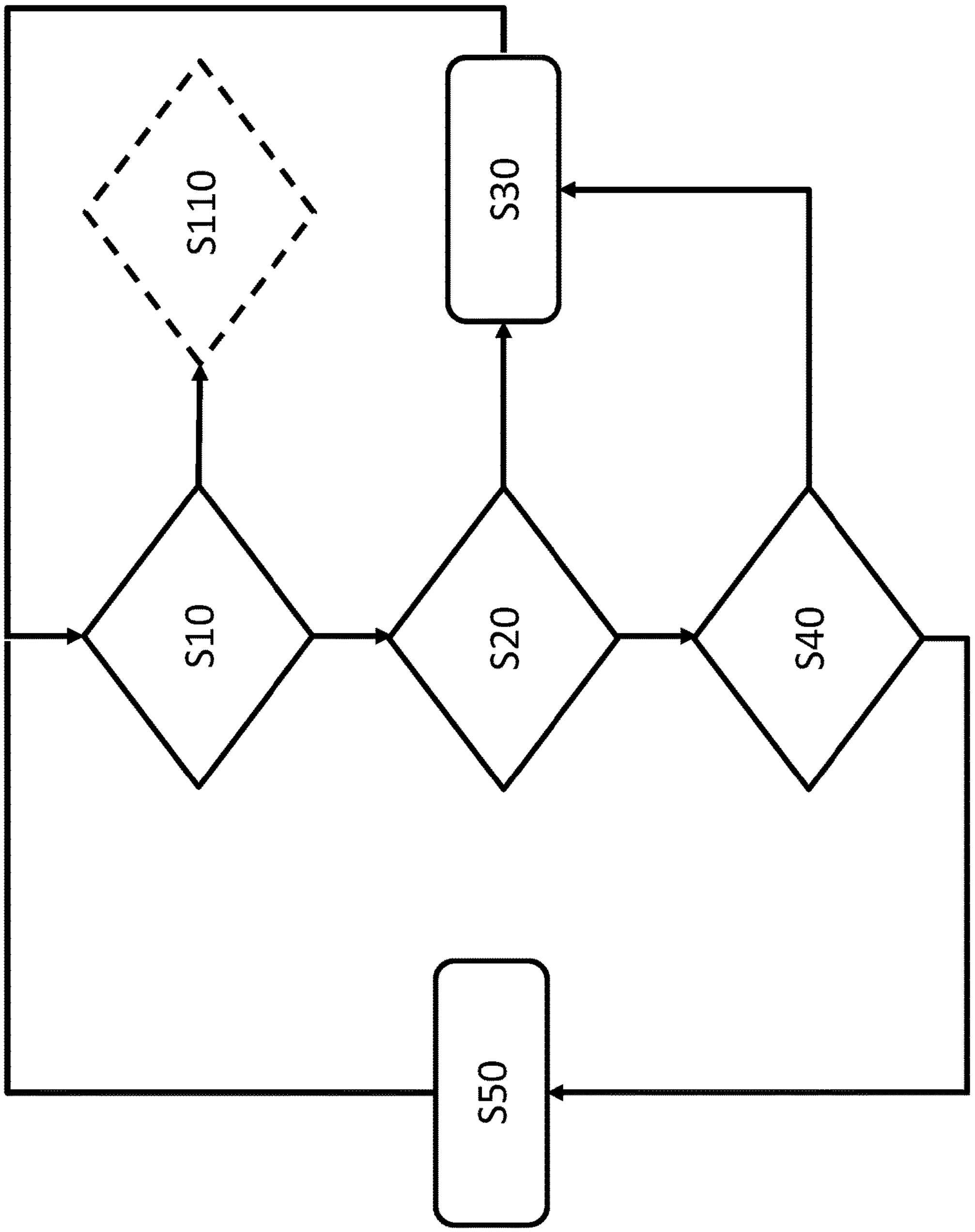
FIG. 7 is a flow chart of a method of controlling a heater of a cabin climate control assembly according to an embodiment.

FIG. 7 illustrates a method of controlling the heater 118 during charging of the working vehicle 10, according to an embodiment. At step S10, the controller 136 determines from input I1 whether the working vehicle 10 is on charge. If the working vehicle 10 is not on charge, the controller 136 proceeds to step S110 (the first step of the method illustrated in FIG. 8). If the working vehicle 10 is on charge, the controller 136 proceeds to step S20. At step S20, the controller 136 determines from input I4 whether the outside air temperature is below a threshold air temperature (e.g. below 5° C.). If the outside air temperature is not below the threshold air temperature, the controller 136 proceeds to step S30 and sets output O4 to not run the heater 118. If the outside air temperature is below the threshold air temperature, the controller 136 proceeds to step S40. At step S40, the controller 136 determines from input I6 whether the liquid temperature is above a threshold liquid temperature (e.g. above 50° C.). If the liquid temperature is above the threshold liquid temperature, the controller 136 proceeds to step S30 and sets output O4 to not run the heater 118. If the liquid temperature is not above the threshold liquid temperature, the controller 136 proceeds to step S50. At step S50 the controller 136 sets output O4 to run the heater 118. Following either step S30 or S50, the controller 136 loops back to step S10 to start a new cycle.

In other embodiments, a different method of controlling the heater 118 during charging of the working vehicle 10 is provided. For example, since the liquid temperature (I6) and outside air temperature (I4) are typically similar when the working vehicle 10 is shut down for a long period of time (e.g. when charging overnight), step S20 may be omitted from the method illustrated in FIG. 7.

It will be understood that when the working vehicle 10 is started in a cold environment, the temperature of refrigerant in the first circuit 102 and liquid in the second circuit 104 may be too low for the heat generated via work done by the compressor 108 and re-use of latent heat to warm the cabin 18 to a comfortable temperature within an acceptable timeframe (e.g. in accordance with international standard ISO10263-4). Therefore, the heater 118 may be run after start-up of the working vehicle 10 in order to "kick-start" the heating loop.

Figure 8:
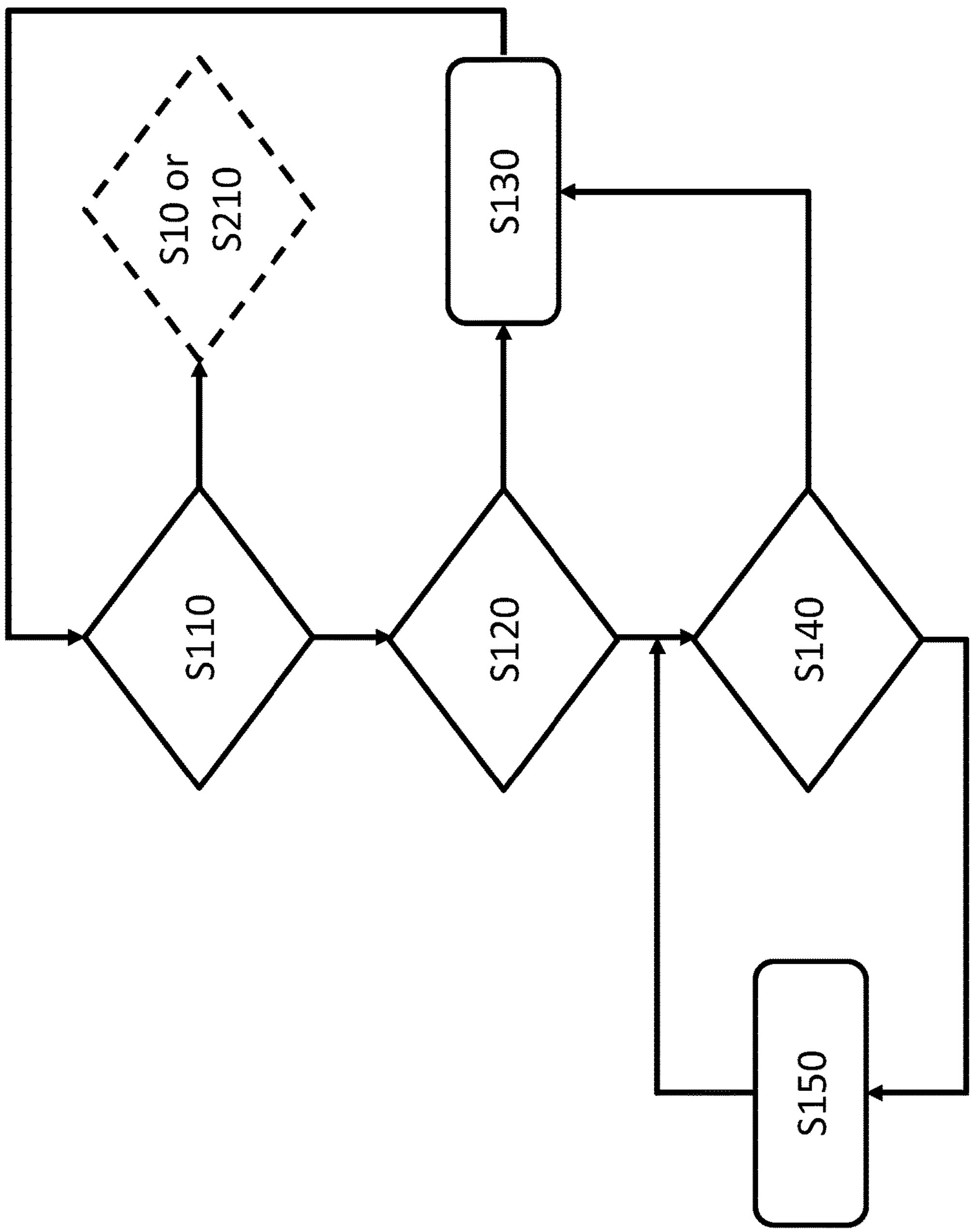
FIG. 8 is a flowchart of another method of controlling a heater of a cabin climate control assembly according to an embodiment.

FIG. 8 illustrates a method of controlling the heater 118 at start-up of the working vehicle 10, according to an embodiment. At step S110, the controller 136 determines from input I2 whether the working vehicle 10 has been started after a period of being shut down. If the working vehicle 10 has not been started after a period of being shut down, the controller 136 proceeds to step S10 (the first step of the method illustrated in FIG. 7) if the working vehicle 10 is shut down, or to step S210 (the first step of the method illustrated in FIG. 9) if the working vehicle 10 is running. If the working vehicle 10 has been started after a period of being shut down, the controller 136 proceeds to step S120. At step S120, the controller 136 determines from input I4 whether the outside air temperature is below a threshold air temperature (e.g. below 5° C.). If the outside air temperature is not below the threshold air temperature, the controller 136 proceeds to step S130 and sets output O4 not to run the heater 118. If the outside air temperature is below the threshold air temperature, the controller proceeds to step S140. At step S140, the controller 136 determines from input I6 whether the liquid temperature is above a threshold liquid temperature (e.g. above 30° C.). If the liquid temperature is above the threshold liquid temperature, the controller 136 proceeds to step S130 and sets output O4 to not run the heater 118. If the liquid temperature is not above the threshold liquid temperature, the controller 136 proceeds to step S150. At step S150 the controller 136 sets output O4 to run the heater 118. Following step S150, the controller loops back to step S140. In this way, the heater 118 is continually run (by cycling through steps S140 and S150) until the liquid temperature is greater than the threshold liquid temperature, and the controller 136 moves on to step S130. Following step S130 the controller 136 loops back to step S110 to start a new cycle.

It will be understood that the temperature of refrigerant in the first circuit 102 and liquid in the second circuit 104 will be approximately equal to the outside air temperature when the working vehicle 10 is started after a long period (e.g. first thing in the morning after not being used overnight). Therefore, running the heater 118 when the outside air temperature is below a threshold air temperature (e.g. less than 5° C.) at start-up of the working vehicle 10 helps to heat the refrigerant in the first circuit 102 to ensure proper functioning of the compressor 108 and to avoid icing in the evaporator 106.

In other embodiments, a different method of controlling the heater 118 at start-up of the working vehicle 10 is provided. For example, instead of determining whether the outside air temperature is below a threshold air temperature at step S120, the controller 136 may determine whether a temperature differential between the desired cabin temperature (from input I3) and outside air temperature (from input I4) is above a threshold temperature differential (e.g. greater than 15° C.). In such embodiments, the controller 136 then proceeds to step S130 if the temperature differential is not above the threshold temperature differential and to step S140 if the temperature differential is above the threshold temperature differential. In this way, when the desired cabin temperature is close to the outside air temperature at start-up, the heater 118 is not used, which saves energy. However, when there is a large temperature differential at start-up, the heater 118 is used in order to reach the desired cabin temperature within an acceptable timeframe (e.g., in accordance with international standard ISO10263-4).

Figure 9:
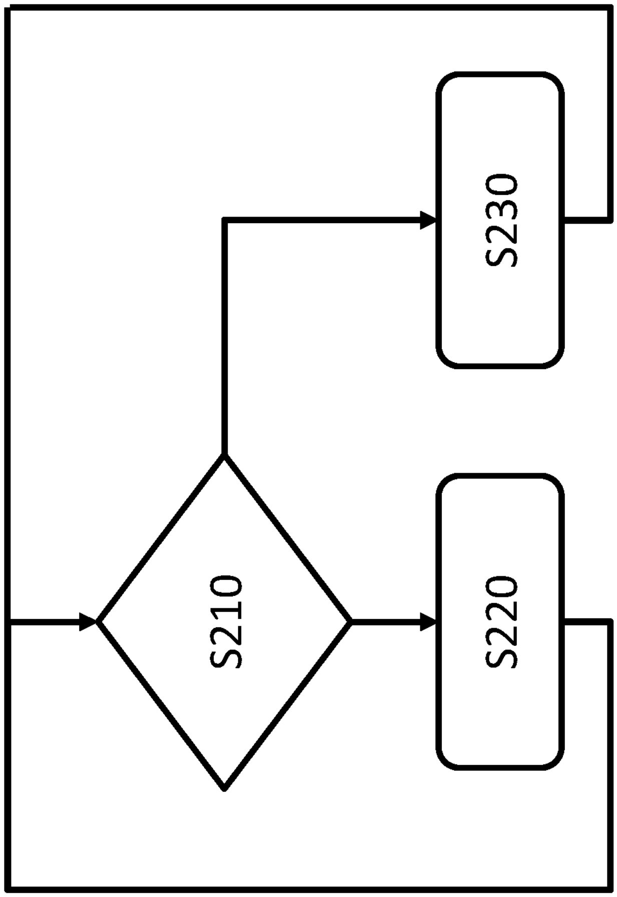
FIG. 9 is a flowchart of another method of controlling a heater of a cabin climate control assembly according to an embodiment.

FIG. 9 illustrates a method of controlling the heater 118 when the working vehicle 10 is running, according to an embodiment. At step S210, the controller 136 determines whether a temperature differential between the desired cabin temperature (from input I3) and the actual cabin temperature is above a threshold temperature differential (e.g. above 15° C.). If the temperature differential is not above the threshold temperature differential, the controller 136 proceeds to step S220 and sets output O4 to not run the heater 118. If the temperature differential is above the threshold temperature differential, the controller 136 proceeds to step S230. At step S230 the controller 136 sets output O4 to run the heater 118. Following either step S220 or S230, the controller 136 loops back to step S210 to start a new cycle until the working vehicle 10 is shut down.

It will be understood that when there is a large temperature differential between the desired cabin temperature and actual cabin temperature (e.g. greater than 15° C.), a greater amount of heat energy will be required in order to reach the desired cabin temperature within an acceptable timeframe. Therefore, running the heater 118 when the temperature differential is above a threshold temperature differential helps to reach the desired cabin temperature more quickly (e.g., within the time frame specified by international standard ISO10263-4).

In other embodiments, a different method of controlling the heater 118 when the working vehicle 10 is running is provided. For example, instead of determining a temperature differential between the desired cabin temperature and actual cabin temperature at step S210, the controller 136 may instead determine a temperature differential between the desired cabin temperature (from input I3) and the outside air temperature (from input I4). It will be understood that a greater amount of heat energy will be required to maintain the desired cabin temperature when there is a larger temperature differential between the desired cabin temperature and the outside air temperature. Therefore, running the heater 118 when the temperature differential is above a threshold temperature differential helps to maintain a desired cabin temperature.

In some embodiments, there may be an additional step between S210 and S230 in which the controller checks whether the liquid temperature (from input I6) is below a threshold liquid temperature. In such embodiments, the controller 136 may only proceed to step S230 and set output O4 to run the heater 118 when the liquid temperature is below the threshold liquid temperature.

It will be understood that once the liquid in the second circuit 104 reaches a threshold liquid temperature (e.g. greater than 30° C.), the heat energy generated through work done by the compressor 108 and re-use of latent heat may be sufficient to reach and maintain the desired cabin temperature. In addition, once the threshold liquid temperature is reached, the refrigerant in the first circuit 102 will be at a sufficient temperature to ensure proper function of the compressor 108 and avoid icing of the evaporator 106. Therefore, in embodiments where the heater 118 is turned off when it is determined that the liquid temperature is above the threshold liquid temperature (e.g. at step S40 or S140 in FIGS. 7 and 8 above), this helps to save energy by not running the heater 118 when it is not required. In the case of an electric working vehicle, this reduced energy can result in increased run time.

In some embodiments, the cabin climate control assembly 100 is configured to gradually reduce a heat output of the heater 118 as the temperature of the liquid in the second circuit 104 approaches the threshold liquid temperature. This allows a reduction of energy supplied to the heater 118 before the heater 118 can be completely turned off, which leads to a reduction in the energy supplied to the heater 118 in comparison to binary on/off control, and a corresponding increase in run time. It will be understood that the gradual reduction in heat output may be a discrete (i.e. stepped) reduction (e.g. with one or more steps between "fully on" and "fully off" states of the heater 118) or a continuous reduction (e.g. a linear or exponential decrease).

In some embodiments, the cabin climate control assembly 100 is configured to control the heat output of the heater 118 by pulse width modulation. In other words, the heater 118 may be turned on and off in pulses in order to provide a desired average heat output. In such embodiments, the heat output of the heater 118 may be gradually reduced by gradually increasing the duration of the "off" pulses and gradually reducing the duration of the "on" pulses.

In alternative embodiments, the heat output of the heater 118 is gradually reduced by gradually reducing a voltage supplied to the heater 118.

The one or more embodiments are described above by way of example only and it will be appreciated that the variations are possible without departing from the scope of protection afforded by the appended claims.

It should also be noted that whilst the appended claims set out particular combinations of features described above, the scope of the present disclosure is not limited to the particular combinations hereafter claimed, but instead extends to encompass any combination of features herein disclosed.

The invention claimed is:

1. A cabin climate control assembly for a working vehicle, the cabin climate control assembly comprising:

a first circuit for circulating a refrigerant;

a second circuit for circulating a liquid;

an evaporator configured to transfer heat energy to the refrigerant in the first circuit;

a compressor configured to compress the refrigerant in the first circuit and thereby generate additional heat energy in the first circuit;

a condenser configured to transfer heat energy between the compressed refrigerant and the liquid in the second circuit;

a heat exchanger configured to expel heat energy from the liquid in the second circuit;

wherein the cabin climate control assembly comprises a heating mode in which the cabin climate control assembly is configured to remove heat energy from air entering or circulating within a cabin of the working vehicle via the evaporator, then add the removed heat energy and additional heat energy generated by the compressor back into the air entering or circulating within the cabin via the heat exchanger, in order to raise the temperature of the cabin;

wherein the cabin climate control assembly comprises a diverter positioned between the evaporator and the heat exchanger, the diverter being configured to divert air which has been cooled by the evaporator to the outside of the cabin; and wherein the diverter is actuatable such that all of the air which has been cooled by the evaporator is only divertable to the outside of the cabin and/or towards the heat exchanger.

2. The cabin climate control assembly of claim 1, wherein the second circuit comprises a heater configured to raise a temperature of the liquid in the second circuit, wherein, optionally, the heater is an immersion heater contained within pipework of the second circuit such that liquid flowing through the second circuit contacts the immersion heater.

3. The cabin climate control assembly of claim 2, wherein the working vehicle is an electric or plug-in hybrid working vehicle and wherein the cabin climate control assembly is configured to run the heater when it is determined that the working vehicle is on charge.

4. The cabin climate control assembly of claim 2, wherein the cabin climate control assembly is configured to run the heater when it is determined that a temperature differential between a desired cabin temperature and an outside air temperature or actual cabin temperature is greater than a threshold temperature differential.

5. The cabin climate control assembly of claim 2, wherein, at start-up of the working vehicle, the cabin climate control assembly is configured to run the heater when it is determined that an outside air temperature is below a threshold air temperature.

6. The cabin climate control assembly of claim 3, wherein the cabin climate control assembly is configured to turn off the heater when a temperature of the liquid in the second circuit is greater than a threshold liquid temperature, optionally, wherein the cabin climate control assembly is configured to gradually reduce a heat output of the heater as the temperature of the liquid in the second circuit approaches the threshold liquid temperature.

7. The cabin climate control assembly of claim 1, further comprising one or more fans configured to direct air entering or circulating within the cabin towards the evaporator and/or heat exchanger.

8. The cabin climate control assembly of claim 1, further comprising an external air inlet, the external air inlet being in fluid communication with the evaporator for extraction of heat from the external air.

9. The cabin climate control assembly of claim 1, wherein the diverter is configured to be selectively actuated to divert a first portion of external air received from the external air inlet to the outside of the cabin, and a second portion of external air received from the external air inlet to the heat exchanger.

10. The cabin climate control assembly of claim 1, wherein the second circuit comprises a radiator external to the cabin and a valve arrangement configured to selectively direct liquid in the second circuit from the condenser towards the heat exchanger and/or the radiator.

11. The cabin climate control assembly of claim 10, comprising a cooling mode in which the cabin climate control assembly is configured to remove heat energy from air entering or circulating within the cabin via the evaporator, then transfer the removed heat energy to an external environment via the radiator, in order to reduce the temperature of the cabin.

12. The cabin climate control assembly of claim 10, comprising a mixed mode in which the cabin climate control assembly is configured to remove heat energy from air entering or circulating within the cabin via the evaporator, then transfer a first portion of the removed heat energy and additional heat energy generated by the compressor back into the air entering or circulating within the cabin via the heat exchanger and a second portion of the removed heat energy and additional heat energy generated by the compressor to an external environment via the radiator.

13. The cabin climate control assembly of claim 12, wherein the ratio of the first and second portions is controlled by the valve arrangement in order to maintain a temperature within the cabin.

14. The cabin climate control assembly of claim 12, wherein the valve arrangement comprises a first valve configured to control flow of liquid in the second circuit between the condenser and the heat exchanger and a second valve configured to control flow of liquid in the second circuit from the condenser to the radiator.

15. The cabin climate control assembly of claim 10, further comprising a radiator fan configured to blow ambient air across the radiator.

16. The cabin climate control assembly of claim 1, comprising an expansion device located in the first circuit between the condenser and the evaporator.

17. The cabin climate control assembly of claim 1, comprising a pump configured to circulate the liquid around the second circuit.

18. The cabin climate control assembly of claim 1, further comprising a receiver drier in the first circuit to remove moisture and/or debris from refrigerant circulating in the first circuit.

19. A cabin climate control assembly for a working vehicle, the cabin climate control assembly comprising:

a first circuit for circulating a refrigerant;

a second circuit for circulating a liquid;

an evaporator configured to transfer heat energy to the refrigerant in the first circuit;

a compressor configured to compress the refrigerant in the first circuit and thereby generate additional heat energy in the first circuit;

a condenser configured to transfer heat energy between the compressed refrigerant and the liquid in the second circuit;

a heat exchanger configured to expel heat energy from the liquid in the second circuit;

wherein the cabin climate control assembly comprises a heating mode in which the cabin climate control assembly is configured to remove heat energy from air entering or circulating within a cabin of the working vehicle via the evaporator, then add the removed heat energy and additional heat energy generated by the compressor back into the air entering or circulating within the cabin via the heat exchanger, in order to raise the temperature of the cabin;

wherein the cabin climate control assembly comprises a diverter positioned between the evaporator and the heat exchanger, the diverter being configured to divert air which has been cooled by the evaporator to the outside of the cabin, and wherein the diverter is configured to be selectively actuated such that all of the air which has been cooled by the evaporator is directed to one or both of the outside of the cabin and/or the heat exchanger irrespective of the position of the diverter.

20. A cabin climate control assembly for a working vehicle, the cabin climate control assembly comprising:

a first circuit for circulating a refrigerant;

a second circuit for circulating a liquid;

an evaporator configured to transfer heat energy to the refrigerant in the first circuit;

a compressor configured to compress the refrigerant in the first circuit and thereby generate additional heat energy in the first circuit;

a condenser configured to transfer heat energy between the compressed refrigerant and the liquid in the second circuit;

a heat exchanger configured to expel heat energy from the liquid in the second circuit;

wherein the cabin climate control assembly comprises a heating mode in which the cabin climate control assembly is configured to remove heat energy from air entering or circulating within a cabin of the working vehicle via the evaporator, then add the removed heat energy and additional heat energy generated by the compressor back into the air entering or circulating within the cabin via the heat exchanger, in order to raise the temperature of the cabin;

wherein the cabin climate control assembly comprises a diverter positioned between the evaporator and the heat exchanger, the diverter being configured to divert air which has been cooled by the evaporator to the outside of the cabin, and wherein the diverter is configured to be selectively actuated between a range of diverter positions in order to direct all of the air which has been cooled by the evaporator into a first portion of air which is diverted outside of the cabin and/or a second portion of air which is directed into the cabin; and wherein the cabin climate control assembly is configured such that all of the second portion of air is directed into the cabin via the heat exchanger in all of the range of diverter positions.

* * * * *